United States Patent
Bettführ et al.

(10) Patent No.: US 10,974,918 B2
(45) Date of Patent: Apr. 13, 2021

(54) METHOD FOR TESTING A FUNCTIONAL UNIT FOR USE ON A MOVING MATERIAL WEB

(71) Applicant: BST eltromat International GmbH, Bielefeld (DE)

(72) Inventors: Jürgen Bettführ, Bielefeld (DE); Theodor Nacke, Bielefeld (DE)

(73) Assignee: BST eltromat International GmbH, Bielefeld (DE)

( * ) Notice: Subject to any disclaimer, the term of this patent is extended or adjusted under 35 U.S.C. 154(b) by 244 days.

(21) Appl. No.: 16/339,531

(22) PCT Filed: Aug. 3, 2017

(86) PCT No.: PCT/EP2017/069632
§ 371 (c)(1),
(2) Date: Apr. 4, 2019

(87) PCT Pub. No.: WO2018/068916
PCT Pub. Date: Apr. 19, 2018

(65) Prior Publication Data
US 2020/0039208 A1 Feb. 6, 2020

(30) Foreign Application Priority Data

Oct. 11, 2016 (DE) .......................... 102016119292.9

(51) Int. Cl.
*B65H 23/038* (2006.01)
*B41F 33/00* (2006.01)

(52) U.S. Cl.
CPC ....... *B65H 23/038* (2013.01); *B41F 33/0009* (2013.01); *B65H 2553/42* (2013.01); *B65H 2553/46* (2013.01); *B65H 2557/61* (2013.01); *B65H 2557/65* (2013.01)

(58) Field of Classification Search
CPC .............. B65H 23/038; B65H 2553/46; B65H 2557/61; B65H 2557/65
See application file for complete search history.

(56) References Cited

FOREIGN PATENT DOCUMENTS

| DE | 102008059584 A1 | 6/2010 |
|---|---|---|
| DE | 202010008084 U1 | 12/2011 |
| DE | 202015101700 U1 | 8/2016 |
| EP | 2186639 A2 | 5/2010 |

*Primary Examiner* — William E Dondero
(74) *Attorney, Agent, or Firm* — Richard M. Goldberg

(57) ABSTRACT

A method of testing a functional unit includes an optical sensor system (28) for detecting an optical signal from at least a part of a moving material web (14), a data processing system (36) for valuating the optical signals, and a display (38) displaying a state of the material web (14) and arranged in a sensitive range (30) of the sensor system (28).

14 Claims, 7 Drawing Sheets

METHOD FOR TESTING A FUNCTIONAL UNIT FOR USE ON A MOVING MATERIAL WEB

BACKGROUND OF THE INVENTION

The invention relates to a method for testing a functional unit, comprising an optical sensor system for detecting an optical signal from at least a part of a moving material web, and a data processing system for evaluating the optical signal.

The functional unit may for example be a web guide control device in a rotary printing press.

DE 10 2008 059 584 A1 describes a web guide control device which serves for controlling the register of a print substrate web in a rotary printing press. The optical system may be formed by a camera, e.g. a line camera, which captures the entire width of the running material web at a predetermined measurement position. In particular, the sensor system serves for detecting the position of the left and right edges of the material web, so that possible positional deviations of the material web can be recognised and corrected by means of corresponding actuation commands for an actor system, if necessary.

Functional units having a camera which serves for example for web monitoring, web inspection and/or automatic error detection may also be employed on running material webs in rotary printing presses. Then, the recording cycle of the camera is synchronised with the repeat of the printed images on the print substrate web, so that a stationary image is obtained in accordance with the stroboscopic principle.

Before the camera systems are installed in the printing press, they have to be subjected to thorough testing, including in particular long-term tests which check not only the recording properties of the camera and the function of post-processing software but also the synchronisation of the image recordal with the repeat. To that end, it is known to mount the camera in front of the peripheral surface of a rotating cylinder on which, for simulating a running material web, a substrate is applied that carries only a single print format and extends essentially over the entire periphery of the cylinder, so that, over the duration of the test, the camera records the same image again in each revolution of the cylinder.

SUMMARY OF THE INVENTION

It is an object of the invention to provide a method that facilitates functional tests on functional units of the type discussed above. In this context, the term "functional tests" shall be construed in a broad sense and shall also include demonstrations in which the function and capabilities of the functional unit are demonstrated on a trade fair, for example.

In the method according to the invention, this object is achieved by that a display on which the state of the material web is represented is arranged in a sensitive range of the sensor system.

By means of the display, different conditions of the material web, such as different widths, positions and colours of the material web, can very easily and flexibly be simulated without the material web and an associated web transport system having to be actually present. In particular, the simulation can also take place outside of the printing press, e.g. in a trade fair booth. The reaction of the system on the simulated conditions can be tracked for example by evaluating the adjustment commands generated by the data processing system or by evaluating other data that are provided by the data processing system, such as processed image data that are based on the optical signal captured by the sensor system.

Useful details and further developments of the invention are indicated in the dependent claims.

In one embodiment, the method is used for testing or demonstrating web guide control devices. Then, the response of the web on the actuation commands for the actor system, as calculated by the data processing system, may be simulated.

The display may for example be a computer screen, possibly also the screen of a tablet computer or optionally also a canvas screen onto which an image is projected by means of a beamer.

A driver that receives data from the data processing system of the web guide control device and calculates the image to be shown on the display in accordance with these data may be associated with the display. Thus, by evaluating for example the adjustment commands for the actor system, the resulting positional changes of the material web may be simulated.

In a useful embodiment, the display shows also an image that is based on the optical signal captured by the optical sensor system. For example, this image may be constituted directly by the image that has been recorded by the optical sensor system, i.e. by a line camera, for example.

In the data processing system of the web guide control device, the image captured by the optical sensor system is typically subjected to image processing which identifies in particular the positions of the edges of the material web. In a particularly useful embodiment, the display shows an image that indicates the positions of the edges of the material web, which positions have been obtained as a result of the image processing, possibly together with a brightness curve that represents the non-processed image as seen by the line camera. In this way, it can be demonstrated how good the system detects the position of the web edges and how fast it reacts upon possible positional changes.

If the camera serving as the optical sensor system, e.g. a line camera or a matrix camera, is a color camera, the brightness signal that serves for detecting the edges of the material web may be modified by assigning different weights to the various color channels, so that a contrast as high as possible is obtained at the web edges. Different color and transparency properties of the material web may be simulated by means of the display, and the evaluation of the optical signal can then be optimized for the respective condition, with the obtained result being directly made visible on the display.

In an advantageous embodiment, the display is at least temporarily installed in the machine in which the web guide control device is used. Preferably, the installation of the display and/or the image rendering on the display is arranged such that the rendered image has a precisely defined position relative to the web transport system of the machine. This offers the possibility to use the display and the state of the material web as simulated thereon also for adjusting and/or calibrating the optical sensor system. For example, if the sensor system is formed by a line camera, a possible skew of the line camera relative to the transport direction of the material web may be detected and corrected, if necessary.

Likewise, calibration templates which enable a realistic scaling of the image captured by the optical sensor system as well as, optionally, also the correction of imaging errors, may be shown on the display.

In case of material webs that are transparent or more or less translucent, the display may also be utilized as the illumination system or a part of the illumination system in measurements in the light-transmission mode. Then, the contrast may be optimized by a suitable selection of the colors on the display. Likewise, a standardized background for the material web may be formed by means of the display.

If the method is used for testing or demonstrating functional units in which a camera is directed onto a rotating cylinder, a display in the form of a flexible foil-like material may be utilized which is mounted on the periphery of the cylinder. Then, all possible kinds of errors may be simulated by modifying the image rendered on the display between successive resolutions of the cylinder. If the angular displacement of the cylinder is measured simultaneously, the synchronisation of the camera system with the rotation of the cylinder (the repeat) may also be tested.

BRIEF DESCRIPTION OF THE DRAWINGS

Embodiment examples will now be described in conjunction with the drawings, wherein.

DETAILED DESCRIPTION

Figure 1:
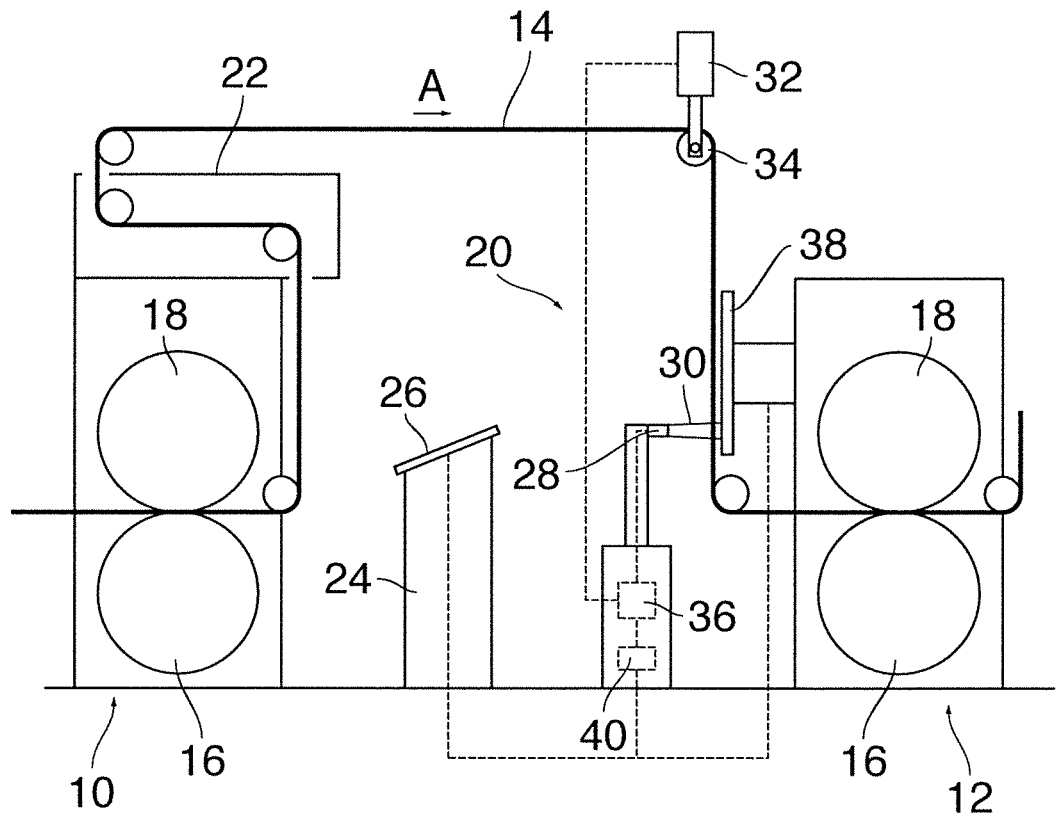
FIG. 1 is a sketch of a rotary printing press having a web guide control device suitable for carrying out the method according to the invention.

Two print units 10, 12 of a rotary printing press, through which a material web 14 (print substrate web) is passed in the direction of an arrow A, have been shown in FIG. 1. Each of the print units 10, 12 has a printing cylinder 16 and a back pressure cylinder 18 between which the material web 14 passes through. Two color component images in different colors are printed in registry onto the material web 14 by means of the printing cylinders 16. Downstream of the print unit 10, the material web 14 passes through a drying station 22 and a web guide control device 20. A control station 24 with a monitor 26 on which the functions of the rotary printing press can be monitored is installed between the two print units 10, 12.

The web guide control device 20 includes an optical sensor system 28 in the form of a line camera which captures the material web 14 and the image that has been printed thereon in the print unit 10 in a sensitive range 30 which extends over the entire width of the material web 14 and protrudes somewhat beyond the material web at both edges. The web guide control device further includes an actor system 32 which acts upon a control drum 34 at which the material web is deflected, and which determines the running direction of the material web and hence the position of the material web in the sensitive range 30 by adjusting the inclination of the control drum 34. Further, the web guide control device 20 includes a data processing system 36 that evaluates the optical signal obtained from the sensor system 28 and calculates, on the basis of that optical signal, actuation commands for the actor system 32 such that the lateral position of the material web 14 (in the direction normal to the plane of the drawing in FIG. 1) is feedback-controlled to a certain target position that assures that the color component images to be printed with the two print units 10, 12 are superposed in registry.

Downstream of the portion of the material web 14 that passes through the sensitive range 30 of the optical sensor system 28, a display 38 is installed that is for example constituted by a computer screen. A part of the display 38 is within the sensitive range 30 of the sensor system 28. The width of the display 38 in the direction transverse to the transport direction of the material web 14 is at least equal to the width of the sensitive range 30.

The image information to be displayed on the display 38 is generated in a driver 40 that is connected to the data processing system 36. The image information generated by the driver may additionally be rendered on the monitor 26 of the control station 24.

If no material web 14 is threaded-in in the printing press, the optical sensor system 28 "sees" a part of the image rendered on the display 38. This image may for example be a simulation of a running material web. Then, this image is evaluated by the web guide control device 20 in the same way as the image of a true material web 14, so that the operation of the web guide control device may be simulated under conditions that may vary within a large range.

Figure 2:
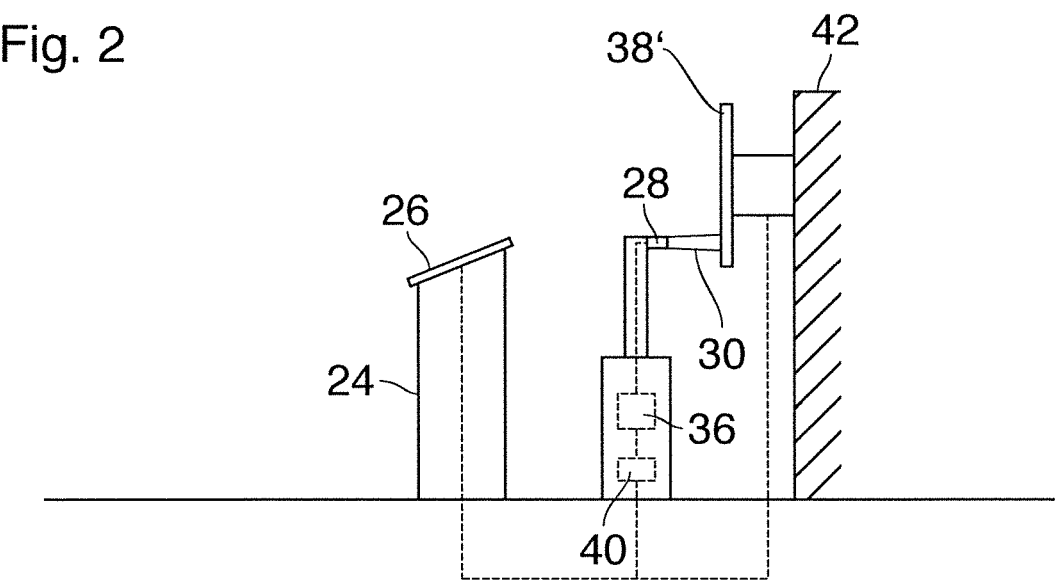
FIG. 2 is a sketch illustrating the use of the method according to the invention for demonstration purposes in a trade fair booth.

FIG. 2 shows parts of the web guide control device, namely the optical sensor system 28 and the data processing 36, as installed in front of a display 38' at a wall of a trade fair booth for demonstration purposes. The spatial relation between the optical sensor system 28 and the display 38' in FIG. 2 is the same as the relation between the sensor system and the display 38 in FIG. 1. In order to demonstrate the function of the web guide control device, the running material web is simulated on the display 38'. This spares the cumbersome installation of a web transport system for a real material web in the trade fair booth.

Optionally, the control station 24 may also be installed in the booth.

Figure 3:
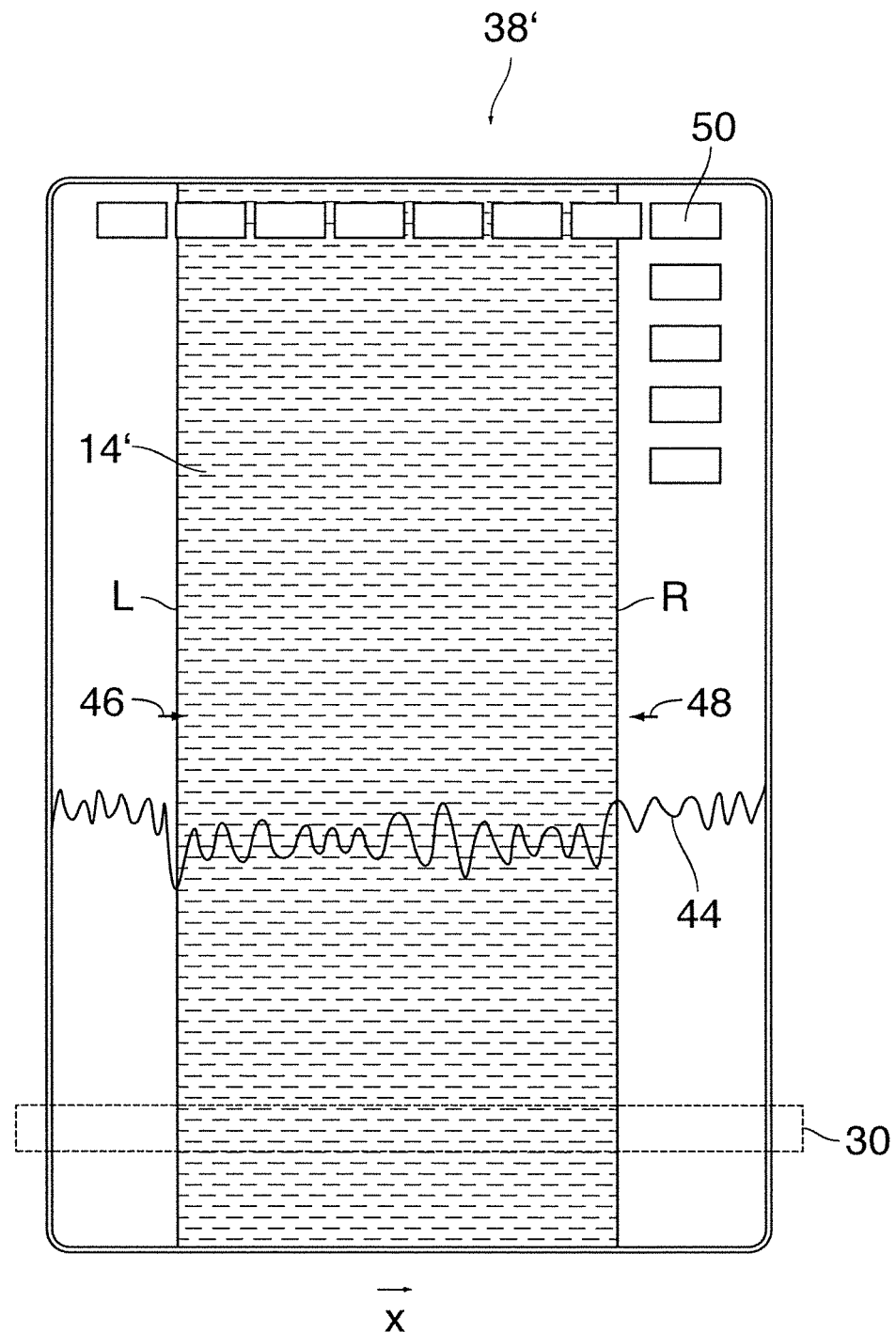
FIGS. 3 and 4 show a display and several images rendered on the display during the execution of the method according to the invention.

FIG. 3 shows the display 38' as it is seen by the sensor system 28 and from the control station 24 in FIG. 2. The image contents on the display 38' comprise a material web 14' that runs continuously from top to bottom, simulating the movement of the real material web 14 in FIG. 1. The sensitive range 30 of the optical sensor system 28 has been shown in dashed lines. Outside of the sensitive range 30, the display shows a curve 44 that represents the optical signal received from the optical sensor system 28. Since the sensor system is a line camera in the example shown here, this signal can be represented as a brightness curve that indicates in real time the brightness of the image pixels as recorded by the line camera as a function of the location of these pixels in the direction x transverse to the running direction of the material web 14'. In the example shown, the shape of the curve 44 shows that the brightness inside the material web 14' is somewhat smaller than the brightness of the background. However, the signal/noise ratio is so low in this case that the left and right edges L and R of the material web 14' can hardly be discerned on the basis of the curve 44.

Two arrows 46, 48 shown on the display 38' mark the target positions of the edges L and R. It can be seen that, in the simulation shown here, the position of the web 14' deviates slightly to the left from the target position.

Further, the display 38' shows several keys 50 which may for example be selected and activated by means of a cursor controlled from the control station 24 in order to control or adjust certain functions and parameters of the web guide control device and possibly also of the related simulation software.

In the example shown, the display 38' is a color display capable of simulating a certain color of the material web 14'. The line camera that constitutes the sensor system 28 is also a color camera. Now, by means of the keys 50, it is possible among others to adjust the weights of the color channels in the signal captured by the line camera such that, for the given color of the material web 14', the contrast between this material web and the background is optimized.

Figure 4:
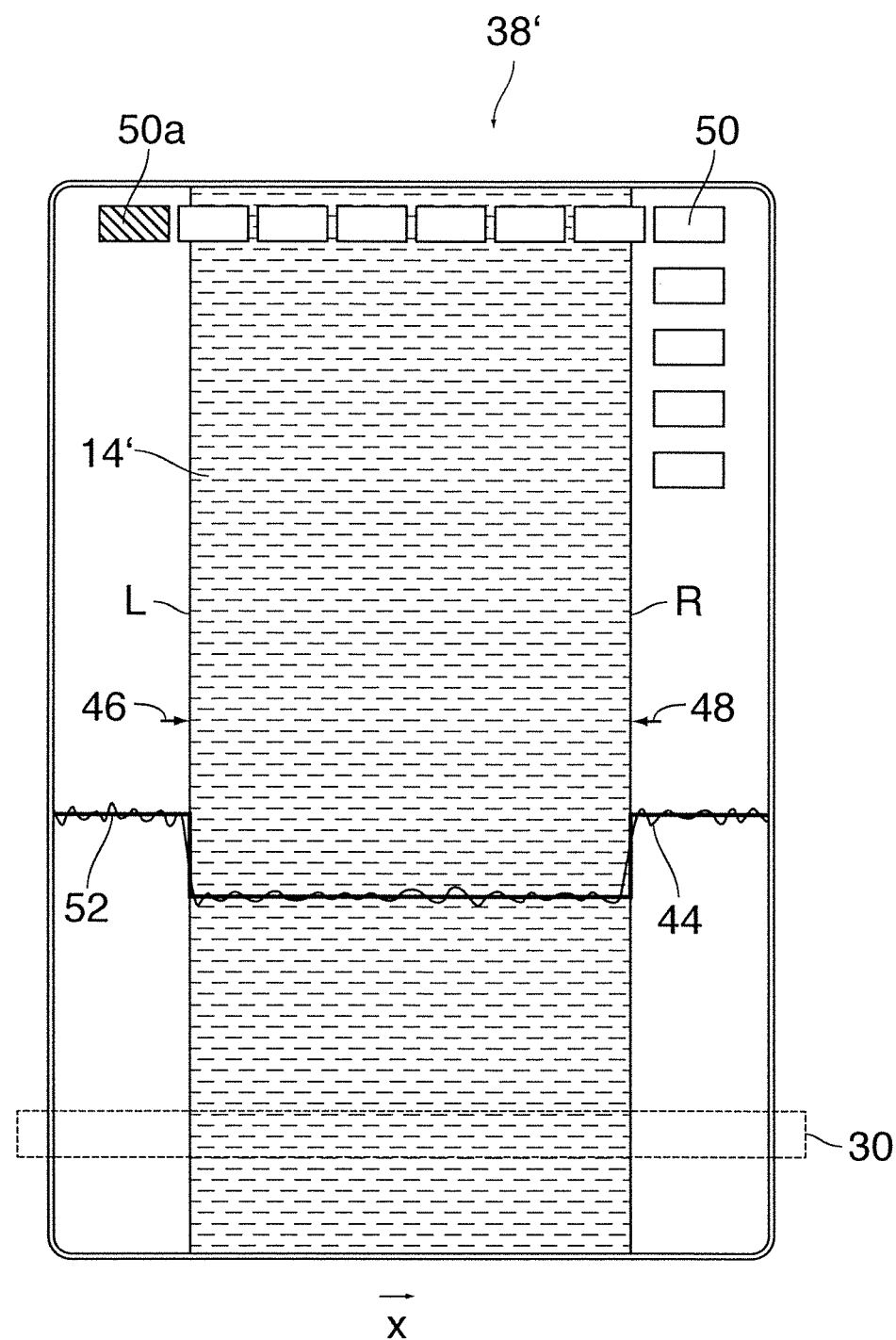

The result has been shown in FIG. 4. Now, the curve 44 shows a substantially larger brightness difference between the material web 14' and the background, this difference being distinctly larger than the noise level. This enables an edge detection algorithm that is implemented in the data processing system 36 to detect the edges L and R of the material web 14' automatically. The fact that the edge detection algorithm has recognized the positions of the edges L and R has been indicated in FIG. 4 by a color change of a corresponding key 50a on the display.

FIG. 4 shows, in addition to the curve 44, a rectangular curve 52 that represents the result of the digital image processing by the edge detection algorithm. For example, the rectangular curve 52 is obtained by thresholding the signal that is represented by the curve 44 with a suitable threshold. Then, the falling and rising flanks of the rectangular curve 52 indicate the positions of the left and right edges L, R of the material web 14' with high precision. This enables the web guide control algorithm implemented in the data processing system 36 to detect the positional deviation of the material web 14' relative to the target position (arrows 46, 48) and to correct the same. In the example shown, the effect of the adjustment commands, as generated by the control algorithm, onto the position of the material web 14' has also been simulated. This is why FIG. 4 shows the material web 14' exactly at the target position indicated by the arrows 46, 48. For demonstration purposes, positional deviations of the material web 14' may now be created artificially, and it can be monitored on the display 38' how the control algorithm corrects these positional deviations.

Likewise is it possible to simulate other colors or transparency properties of the material web 14' and then to observe how this changes the contrast of the curve 44. The settings for the sensitivity of the line camera can then be optimized again in view of the changed color of the material web. The settings that have been optimized for different material webs may be stored and may then be utilized in the real operation of the web guide control device 20 (FIG. 1).

The display 38' may also simulate material webs that carry printed images and, optionally, register marks. The edges of these images or register marks can form further edges that extend in the running direction of the web and can be detected by the edge detection algorithm. Then, it can be determined by means of the keys 50 which of these edges shall form the target for the control; for example, the edges that have been recognized may be identified by running numbers counting the edges from left to right or from the outside to the inside.

As long as no material web 14 has yet been threaded-in in the printing press, the function tests and demonstrations described above may also be performed with the web guide control device 20 and the display 38 integrated in the printing press in FIG. 1.

Figure 5:
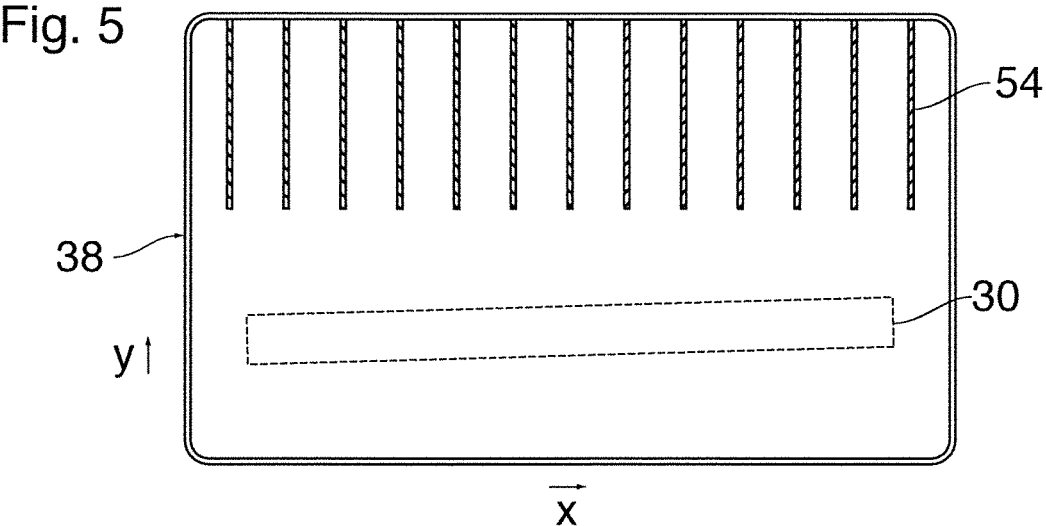
FIGS. 5 to 7 show display images illustrating a method for determining a sensitive range of a line camera.

By means of the display 38' or 38, it is also possible to check the exact position of the sensitive range 30 of the sensor system 28. This has been illustrated in FIGS. 5 to 7 for the display 38 in the printing press as an example. It shall be assumed that the line camera and, correspondingly, the sensitive range 30 is slightly misaligned and inclined relative to the axis x that extends transverse to the running direction of the web, as shown in FIG. 5.

Here, the movement of the material has been simulated by measuring strips 54 or other markers that are distributed over the width of the display 38 and enter into the image from the top downwards in the running direction of the web. In FIG. 5, the measuring strips 54 have not yet reached the sensitive range 30, so that they are not yet detected by the line camera.

Figure 6:
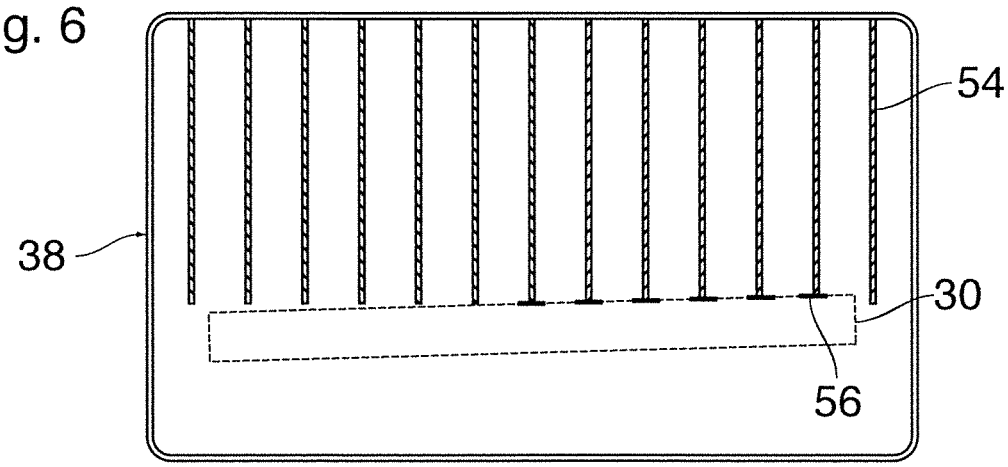

In FIG. 6, some of the measuring strips 54 have reached the sensitive range 30, so that their leading ends are detected by the line camera. Due to the inclination of the sensitive range, however, this applies only to the measuring strips on the right side of the image, whereas the measuring strips on the left side have not quite reached the sensitive range. The timing at which the sensor system detects the leading end of the measuring strip 54 for the first time is stored for each measuring strip, and the position of the measuring strip 54 that has been reached at this instant is indicated on the display by a position mark 56. When further measuring strips 54 reach the sensitive range, new position marks 56 are inserted which, together, indicate the contour of the top edge of the sensitive range 30.

Figure 7:
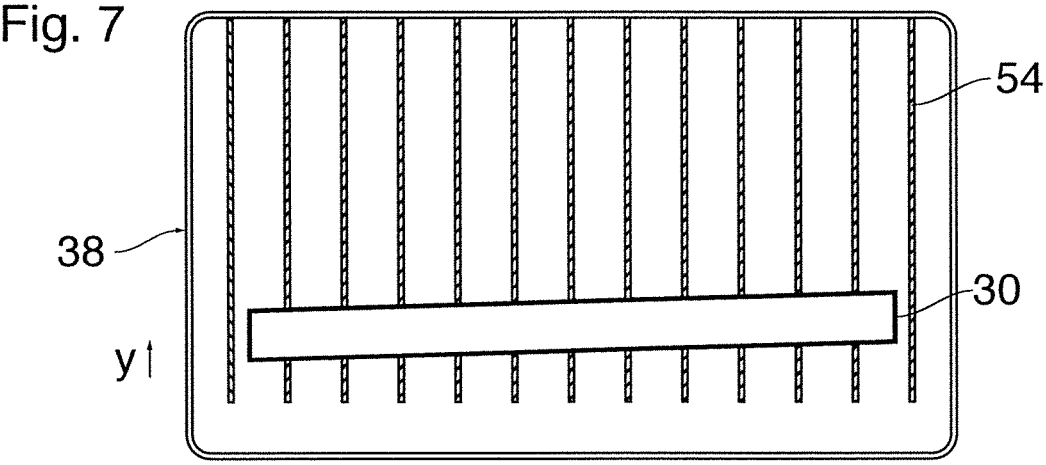

In FIG. 7, the measuring strips 54 have almost reached the bottom edge of the display, and the contour of the sensitive range 30 has been reconstructed on the basis of the positions of the marks 56 and has been faded-in in the image.

In the example shown, the width of the sensitive range 30 is smaller than the width of the display 38, so that some of the measuring strips 54 pass by the sensitive range 30 with a lateral offset without hitting the same. Since these measuring strips do not generate position marks 56, the width of the sensitive range can also be determined on the basis of the position marks 56, with a spatial resolution that corresponds to the spacings between the measuring strips 54.

By recording also the timings at which the leading ends of the measuring strips 54 leave the sensitive range 30 again (in FIG. 7) it is also possible to determine the contour of the lower edge of the sensitive range, so that the height of the sensitive range in the direction y in parallel with the running direction of the web can be measured.

When the display 38 and the sensor system 28 are installed in the printing press, the posture of the sensitive range 30 that has been measured in this way may be utilized for a re-adjusting the sensor system and thereby to eliminate the skew of the line camera. To that end, it may be useful to scale the image rendered on the display 38 such that it has a larger scale in the direction y, so that the skew of the sensitive range 30 is exaggerated.

Figure 8:
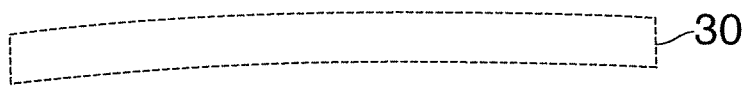
FIGS. 8 and 9 show examples of possible distortions of the sensitive range of a line camera which are detectable with the method according to the invention.

It is also possible with the method described above (in case of a very long line camera) to detect a possible curvature of the line camera and a corresponding curvature of the sensitive range 30, as has been exemplified in FIG. 8.

Figure 9:

In contrast, FIG. 9 shows an example in which the sensitive range 30 has a trapezoidal shape and has a larger height on the right side than on the left side. Such a distortion of the sensitive range may for example be caused by the fact that the line camera is not arranged exactly in parallel with the display 38 and the material web 14, so that the distance to the display is larger on the right side than on the left. Misadjustments of this type can also be detected and corrected, if necessary, with the method described here.

Figure 10:
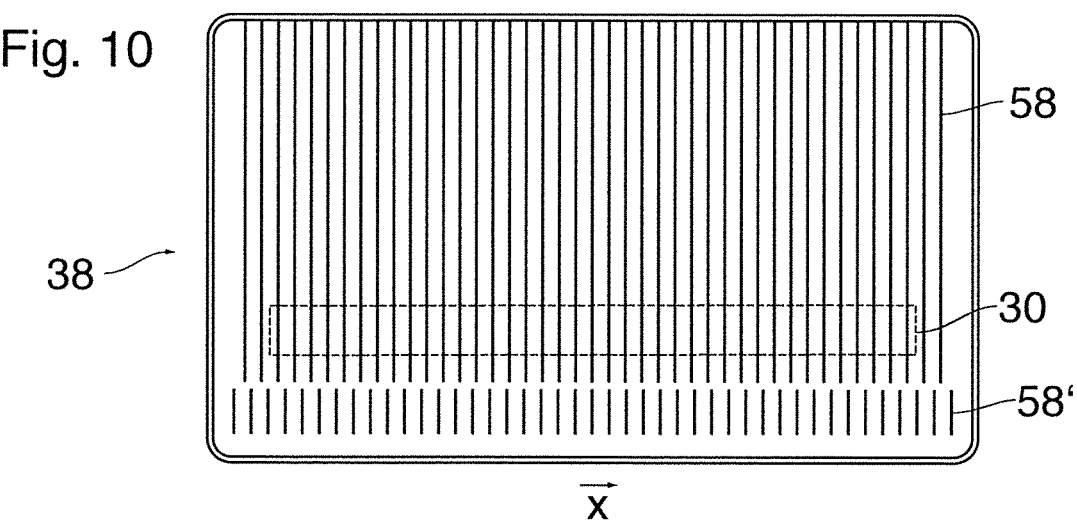
FIGS. 10 and 11 show examples of display images in a method for calibrating the line cameras.
Figure 11:
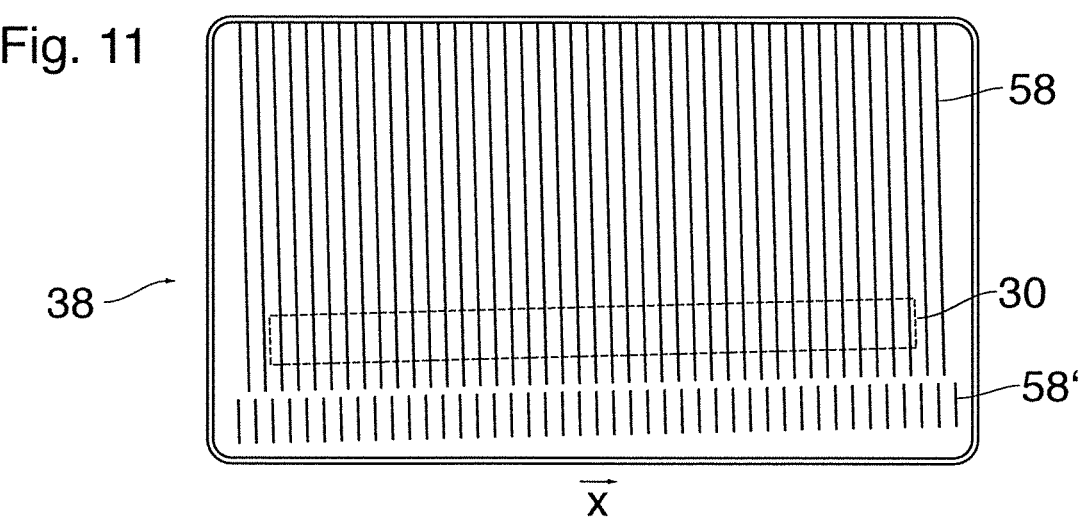

FIGS. 10 and 11 show examples in which measuring strips 58 similar to the measuring strips in FIGS. 5 to 7 are utilized for determining and calibrating the imaging scale of the line camera in the direction x (line direction). In this case, the measuring strips 58 form a relatively narrow uniform raster and are shown on the display 38 in such a manner that they pass through the sensitive range 30 in essentially vertical direction. The rendering of the image on the display 38 is controlled such that the individual measuring strips 58 have uniform spacings from one another, which spacings are exactly known, e.g. spacings of 1 mm.

In the lower part of the image, below the sensitive range 30, FIG. 10 shows an image that has been captured with the line camera and consists of the images 58' of the measuring strips 58. However, due to a scaling error, the spacings between the images 58' is somewhat larger than the actual spacing between the measuring strips 58. Now, in order to calibrate the optical sensor system 28 (line camera), the scaling of the image captured by the line camera is adjusted such that the spacings between the images 58' are brought into coincidence with the spacings between the measuring strips 58. With the line camera thus calibrated, it is possible to make absolute distance measurements in the direction x on the display and, accordingly, on the real material web 14.

FIG. 11 shows the same calibration procedure, but now for the case that the line camera and, correspondingly, the sensitive range 30 are screwed similar as in FIGS. 5 to 7. In this case, at first the skew of the sensitive range 30 is determined by means of the measuring strips 54 or else by means of the vertical measuring strips 58 in FIG. 10, and then the image on the display 38 is rotated such that the measuring strips 58 and the images 58' thereof extend at right angles to the sensitive range 30, as has been shown in FIG. 11. In this way, the calibration may also remove scaling errors that result from the skew of the line camera.

Figure 12:
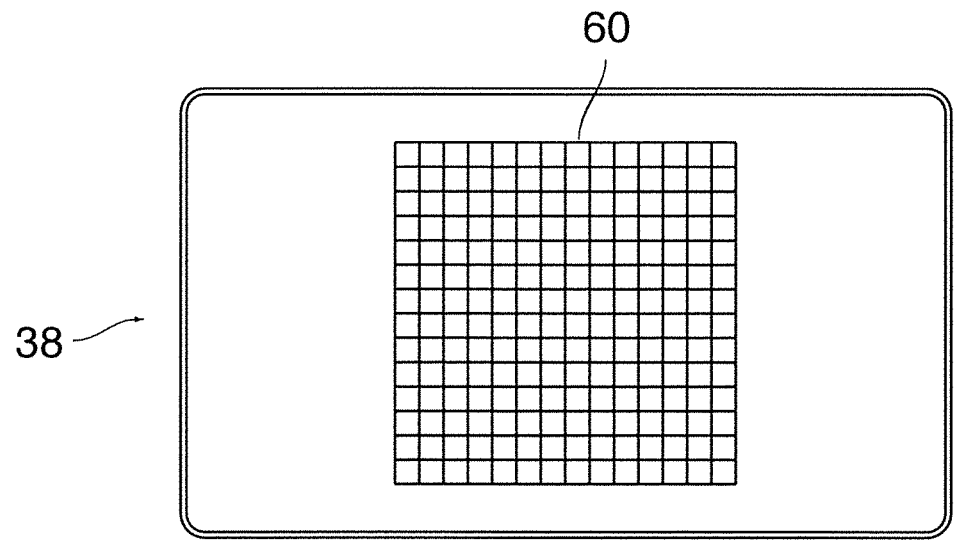
FIGS. 12 and 13 show examples for display images for correcting imaging errors of a matrix camera.
Figure 13:
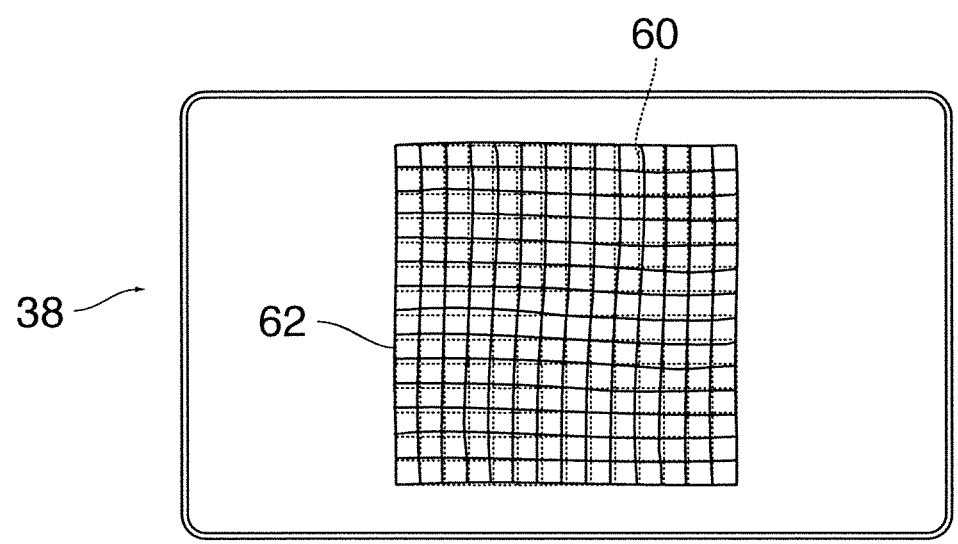

If the optical sensor system 28 is formed by a matrix camera rather than a line camera, an analogous method may be used for detecting and correcting scaling errors as well as rotations and trapezoidal distortions of the two-dimensional image of the matrix camera. To that end, a two-dimensional reference raster 60 is rendered on the display 38 (or 38'), as has been shown in FIG. 12. In this case, the reference raster 60 is preferably rendered as a stationary image. The image rendered on the display 38 is then captured with the matrix camera, and the obtained image 62 is faded-in on the display 38 such that is superposed on the reference raster 60, as has been illustrated in FIG. 13. The deviations caused by the misadjustments or imaging errors can directly be recognized and corrected, if necessary. In the example shown in FIG. 13, the imaging errors result in a non-linear distortion of image 62. On the basis of the reference raster 60, such non-linear image errors may also be corrected by means of a suitable algorithm.

Figure 14:
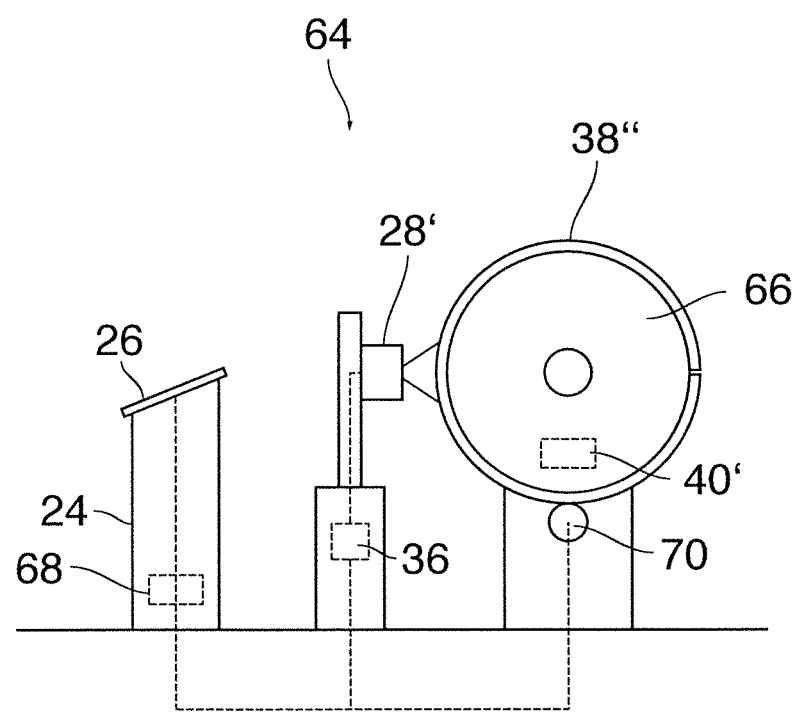
FIG. 14 is a sketch illustrating a method for testing a web monitoring system.

FIG. 14 illustrates a method in which a long-term test is performed on a web monitoring system.

The web monitoring system is formed by a functional unit 64 which has been installed for test purposes in a testing stand and includes, an optical sensor system 28', a matrix camera that is directed onto the peripheral surface of a rotating cylinder 66. The cylinder 66 simulates a cylinder of the printing press over which the printed material web is run, so that it can be observed with the matrix camera. The functional unit 64 further includes the data processing system 36 and optionally the control station 24 with the monitor 26.

A display 38" that is made of a flexible foil-like material is mounted on the periphery of the cylinder 36 so as to enclose the cylinder almost completely. A driver 40' for controlling the display 38" has been installed inside the rotating cylinder 66 in this example, but can also be arranged to communicate with a control apparatus 68 in the control station 24 via a wireless link or via a rotary feedthrough.

Further arranged on the periphery of the cylinder 66 is a friction roller 70 which measures the angular displacement of the cylinder 66 and signals this displacement to the data processing system 36. In addition, the drive system for the cylinder 66 may issue a zero signal that is generated at a certain angular position after each full revolution of the cylinder. The system for detecting the rotary displacement of the cylinder 66 is part of the functional unit 64 and is installed and arranged in the test stand in the same way as in practical use in the printing press.

The display 38" renders an image that corresponds to the printed image on the print substrate web, and a smaller or larger clipping of this image, dependent upon the zoom-settings, may be captured with the matrix camera. The images that are recorded in synchronism with the rotation of the cylinder 66 are shown on the monitor 26 and are also processed electronically and are for example compared to a given reference image in the context of an error recognition system, so that any deviations between the reference image and the actual image can be detected electronically.

Now, the dynamic control of the display 38" via the driver 40' and the control apparatus 68 permits to modify the contents of the image during the test, so that, for example, sporadic errors in the printed image can be simulated, and it can then be checked whether the error recognition system recognises these errors correctly.

In this way, the functional unit 64 can be tested under very realistic operating conditions.

What is claimed is:

1. A method of testing a functional unit, the functional unit comprising:
   an optical sensor system for detecting an optical signal from at least a part of a moving material web, and
   a data processing system for valuating the optical signals, the method comprising the steps of:
   arranging a display in a sensitive range of the sensor system; and
   displaying a state of the material web on the display.

2. The method according to claim 1, wherein the method tests a function of a web guide control device, and further comprising the steps of:
   mechanically acting upon the material web with an actor system,
   evaluating the optical signal with the data processing system, and
   generating adjustment commands for the actor system in response to an output of the data processing system.

3. The method according to claim 2, further comprising the step of showing left and right edges of a material web simulating the real material web on the display.

4. The method according to claim 3, further comprising the steps of:
   simulating a running material web on the display, and modifying the position of the web in a direction transverse to a running direction of the web in accordance with adjustment commands generated by the data processing system.

5. The method according to claim 1,
wherein the optical sensor system comprises a camera, and
further comprising the step of displaying image information that is based on an image captured by the camera in an image on the display.

6. The method according to claim 1, further comprising the step of simulating different color and transparency properties of the material web on the display.

7. The method according to claim 1,
wherein the sensitive range of the optical sensor system extends only over a part of an area of the display, and
further comprising the steps of:
  simulating the movement of the material web by measuring marks which run over an image rendered on the display, and
  recording a time at which each measuring mark is detected by the sensor system, thereby to determine a position of the sensitive range on the display.

8. The method according to claim 7, further comprising the steps of:
  temporarily installing the display in a machine in a defined position relative to a web guide control device that is integrated in this machine, and
  using the position of the sensitive range as determined on the basis of the measuring marks for adjusting the sensor system.

9. The method according to claim 1, further comprising the steps of:
  showing markings which have a regular raster on the display, and
  calibrating a camera of the optical sensor system on the basis of the markings.

10. The method according to claim 1, further comprising the steps of:
  temporarily installing the display in a machine in which a web guide control device is integrated, and
  illuminating a back side of the material web facing away from the optical sensor system with light from the display.

11. The method according to claim 1, further comprising the steps of:
  directing a camera of the optical sensor system onto a peripheral portion of a rotating cylinder which represents a cylinder over which the material web is passed in a production mode, and
  mounting the display which is a flexible display on a peripheral surface of the cylinder in a test mode.

12. The method according to claim 11, further comprising the steps of:
  measuring the rotation of the cylinder and
  checking the relation between the measured rotation of the cylinder and image information as captured with the camera.

13. The method according to claim 11, further comprising the step of simulating a sequence of images that are printed on the material web and are different from one another, on the display.

14. A web guide control device for installation in a machine that has a web transport system for a running material web, comprising:
  an optical sensor system for capturing an optical signal from at least a part of the running material web,
  an actor system for mechanically acting upon the material web, and
  a data processing system for evaluating the optical signal and for generating actuation commands for the actor system, and
  a display that is adapted to be installed in the machine in a position in a sensitive range of the optical sensor system.

* * * * *